Patented Jan. 16, 1951

2,537,995

UNITED STATES PATENT OFFICE 2,537,995

HERBICIDES

Horace E. Hall, Nashville, Tenn., assignor to Tennessee Products Corporation, Nashville, Tenn., a corporation of Tennessee No Drawing. Application July 2, 1945,
Serial No. 602,926

1 Claim. (Cl. 71—2.5)

This invention relates to new and improved herbicides and to methods for their employment.

A principal object of this invention is the provision of new and improved herbicides for the control and destruction of weeds. Another object is the provision of herbicides which are selective in action and extremely efficacious in the destruction of weeds. Still further objects include the provision of a new method for the control and destruction of weeds, the provision of new water-soluble, translocated herbicides, and the provision of herbicides which may be employed for the control of weeds in areas in which live stock graze without fear of causing injury to the live stock. Still further objects and the entire scope of applicability of this invention will become apparent from the detailed description given hereinafter.

These objects are accomplished according to the process of this invention by the provision of herbicides containing as their principal active ingredient aldeyhde/bisulphite and/or ketone/bisulphite addition products and the application of these herbicides in suitable quantities to weeds and the ground upon which they grow.

The procedures of this invention involve first either the provision of aldehyde or ketone bisulphite addition compounds from suitable sources or the preparation of the same by the reaction of an aldehyde or ketone with a suitable bisulphite-ion providing material, such as sodium bisulphite, or by reaction of the aldehyde and ketone with sulfur dioxide in a basic aqueous medium. The resulting addition compound may then be employed directly in a solution for the control of weeds or it may be isolated as a crystalline material and employed for the control of weeds as a dry, a powdered herbicide alone, or preferably, as an admixture with suitable solid carriers or diluents. The herbicides of this invention may also be efficaciously employed as admixtures with other known herbicides such as sodium chlorate, sodium arsenite, phenols and the like both in solutions or in powder form.

Any aldehydes or ketones capable of forming a bisulphite addition product appear to be suitable for use in this invention and all aldehyde or ketone bisulphite addition compounds appear to possess unique herbicidal characteristics. However, the strength and herbicidal properties of bisulphite addition compounds appear to depend in part upon the specific aldehyde or ketone employed in the production of the complex and I have found that furfural/bisulphite addition compounds and bisulphite addition compounds from pyroligneous oils are especially well suited as herbicides. Other aldenydes and ketones which may be employed in this invention include acetone, formaldehyde, methyletnyl ketone, acetaldehyde, benzaldehyde, octadecylaldehyde and the like.

I have found that aldehyde or ketone bisulphite addition compounds can be advantageously admixed with inert diluents or other less potent herbicides in order to produce a finished herbicide, and in fact, this is the preferred manner of operation of this invention. Thus, a dry powdered product may be prepared from these compounds by mixing them with materials such as fuller's earth, diatomaceous earth and the like. On the other hand, it may be most advantageous for certain purposes to admix these compounds with water-soluble powdered materials in order that the final herbicide may be applied in the field as a dry powder or as a water solution. A mixture of my herbicides with a common salt, i. e., sodium chloride, has been found to be very effective.

It is possible to compound these herbicides with vegetable or synthetic gums adapted to increase the adherence of the composition to the foliage to which they are applied or to incorporate in the compositions such materials as wetting agents, e. g., sulfated alcohols, in order to facilitate the spreading of the composition over the foliage of the weed.

The following examples illustrate this invention in which all parts are by weight unless otherwise specified.

Example 1

Pyroligneous oil derived from the distillation of hard wood is extracted with a saturated water solution of sodium bisulphite. This treatment results in the formation of bisulphite addition complexes of the aldehydes and ketones existing in the pyroligneous oil, which remain dissolved in the water solution and permit the remainder of the pyroligneous oil which does not react with the sodium bisulphite to be separated therefrom.

The water solution of bisulphite addition complexes is diluted with further quantities of water until the solids content of the solution is approximately 1%. This 1% solution is then applied directly to weed growths which require eradication. Because of the high selectivity of these bisulphite addition complexes for weeds as opposed to cultivated growing crops, they can be employed with a high degree of effectiveness for de-weeding cultivated growing crops without substantial damage to the desirable crop and relatively complete eradication of the weeds.

Example 2

100 parts of crude commercial furfural are mixed with 110 parts of sodium bisulphite in a suitable kneading machine. The reaction mix is thoroughly agitated during reaction and sufficiently cooled to remove the heat of reaction. Continued admixture of the reactants results in the formation of a granular, free flowing meal. This meal is washed with methanol to remove unreacted oils. A granular non-sticky, water soluble free flowing powder is obtained.

A dry, powdered, water soluble herbicide is prepared from this granular product by homogeneously admixing the same with an equal part of common salt. The resulting herbicide is applied in the dry form to a weed infested area by applying the powder broadcast fashion in the area at a dosage of about 1-10 pounds per square rod. Good eradication of the weeds results from this procedure and the herbicidal character of the area is maintained over a considerable period of time.

In another case this composition was applied as a 1% solution in water to the lands adjacent to a railroad right-of-way which ran through live stock grazing land. It was found that this resulted in efficient control of the weeds without detriment to the health of the live stock, it being unexpectedly found that live stock have no desire whatsoever to eat vegetation sprayed with these materials.

This invention provides new and unusual herbicides which may be employed for the control of weeds among which may be mentioned crab grasses, sunflower, chick weed, field bind weed, wire weed and the like. These herbicides are to be recommended for control of weeds among cultivated crops because of the high degree of selectivity which they appear to possess for a large number of perennial weeds. These herbicides are also extremely efficient to use, because of their fine translocation characteristics, i. e., their ability to move downward through the conducting tubes of the plant after being applied to the foliage and to come into direct contact with the tissues to be killed. Furthermore, this invention provides a new procedure for the control of weeds which is especially well suited for use in areas adjacent to live stock grazing grounds.

I claim:

A method for the control of weeds which comprises the application of the reaction product of substantially equimolecular proportions of furfural and sodium bisulfite to the weeds and the ground upon which they are growing.

HORACE E. HALL.

REFERENCES CITED

The following references are of record in the file of this patent:

UNITED STATES PATENTS

| Number | Name | Date |
| --- | --- | --- |
| 2,007,433 | Melhus | July 9, 1935 |
| 2,017,147 | Figg | Oct. 15, 1935 |
| 2,079,827 | Volck | May 11, 1937 |
| 2,173,236 | Offord | Sept. 19, 1939 |
| 2,286,226 | Ralston et al. | June 16, 1942 |

FOREIGN PATENTS

| Number | Country | Date |
| --- | --- | --- |
| 437,355 | France | Feb. 16, 1912 |
| 460,546 | Germany | May 31, 1928 |
| 500,549 | Great Britain | Feb. 6, 1939 |

OTHER REFERENCES

Fieser et al., Organic Chemistry, D. C. Heath & Co., Boston, 1944, pages 206, 207.

Richter, Organic Chemistry, vol. III, 11th ed., 1923, English Translation, P. Blakiston's Sons & Co., page 15.

Long, Suppression of Weeds by Fertilizers and Chemicals, March 1934, published by H. C. Long, pages 17, 48.

Aston et al., New England J. Agr., vol. 49, page 45 (1934), thru Chem. Abst., vol. 28 (1934), page 6928.